(12) United States Patent
Shen et al.

(10) Patent No.: US 12,340,216 B1
(45) Date of Patent: Jun. 24, 2025

(54) CONTROL OF INSTRUCTION ISSUE BASED ON ISSUE GROUPS

(71) Applicant: Arm Limited, Cambridge (GB)

(72) Inventors: Xiaoyang Shen, Valbonne (FR); Scott Ryan Tancock, Haverhill (GB); Zichao Xie, Cambourne (GB); Shun Wan, Cambridge (GB); Cédric Denis Robert Airaud, Saint Laurent du Var (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/393,825

(22) Filed: Dec. 22, 2023

(51) Int. Cl.
*G06F 9/38* (2018.01)
*G06F 9/22* (2006.01)
*G06F 9/26* (2006.01)

(52) U.S. Cl.
CPC .............. *G06F 9/223* (2013.01); *G06F 9/261* (2013.01); *G06F 9/264* (2013.01); *G06F 9/3836* (2013.01); *G06F 9/3838* (2013.01)

(58) Field of Classification Search
CPC ....... G06F 9/223; G06F 9/3836; G06F 9/3838
See application file for complete search history.

(56) References Cited

U.S. PATENT DOCUMENTS

| | | | | |
|---|---|---|---|---|
| 6,035,389 A * | 3/2000 | Grochowski | ......... | G06F 9/3863 712/216 |
| 6,550,001 B1 | 4/2003 | Corwin et al. | | |
| 6,553,480 B1 * | 4/2003 | Cheong | ............... | G06F 9/38585 712/23 |
| 6,654,869 B1 * | 11/2003 | Kahle | .................. | G06F 9/3858 712/210 |
| 11,422,821 B1 * | 8/2022 | Hardage, Jr. | ......... | G06F 9/3856 |
| 2007/0198812 A1 * | 8/2007 | Abernathy | ............ | G06F 9/3836 712/214 |
| 2014/0344549 A1 * | 11/2014 | Nilsson | ................. | G06F 9/3851 712/7 |
| 2016/0092216 A1 * | 3/2016 | Busaba | ................ | G06F 9/3853 712/213 |

FOREIGN PATENT DOCUMENTS

EP  3940606  1/2022

OTHER PUBLICATIONS

Combined Search and Examination Report for GB Application No. 2402984.5 dated Jan. 14, 2025, 9 pages.

* cited by examiner

*Primary Examiner* — Jacob Petranek
(74) *Attorney, Agent, or Firm* — NIXON & VANDERHYE P.C.

(57) ABSTRACT

Issue group allocation circuitry controls allocation of each micro-operation to one of a plurality of issue groups, depending on detection of register conflicts between micro-operations, the register conflicts concerning access to registers of a first register set. A given micro-operation is allocated to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation. Issue circuitry controls issue of the micro-operations based on the issue groups, to prevent any instruction in a given issue group being issued until all micro-operations in any older issue group than the given issue group have been issued.

20 Claims, 10 Drawing Sheets

US 12,340,216 B1

CONTROL OF INSTRUCTION ISSUE BASED ON ISSUE GROUPS

BACKGROUND

Technical Field

The present technique relates to the field of data processing.

Technical Background

A data processing apparatus may have issue circuitry for controlling issuing of micro-operations for execution. The timing of issuing a given micro-operation may depend on checking for register conflicts with other micro-operations, to ensure that reads of registers are ordered correctly in program order relative to writes to the same register.

SUMMARY

At least some examples of the present technique provide an apparatus comprising:
  issue circuitry to issue micro-operations for execution; and
  issue group allocation circuitry to control allocation of each micro-operation to one of a plurality of issue groups, depending on detection of register conflicts between micro-operations, the register conflicts concerning access to registers of a first register set; in which:
  the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
  the issue circuitry is configured to control issue of the micro-operations based on the issue groups, to prevent any instruction in a given issue group being issued until all micro-operations in any older issue group than the given issue group have been issued.

At least some examples of the present technique provide a system comprising:
  the apparatus as described above, implemented in at least one packaged chip;
  at least one system component; and
  a board,
  wherein the at least one packaged chip and the at least one system component are assembled on the board.

At least some examples of the present technique provide a chip-containing product comprising the system described above assembled on a further board with at least one other product component.

At least some examples of the present technique provide a method comprising:
  controlling allocation of micro-operations to a plurality of issue groups, depending on detection of register conflicts between the micro-operations, the register conflicts concerning access to registers of a first register set, a given micro-operation being allocated to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
  based on the issue groups, controlling issue of the micro-operations for execution, where any instruction in a given issue group is prevented from being issued until all micro-operations in any older issue group than the given issue group have been issued.

At least some examples of the present technique provide a non-transitory computer-readable medium to store computer-readable code for fabrication of an apparatus comprising:
  issue circuitry to issue micro-operations for execution; and
  issue group allocation circuitry to control allocation of each micro-operation to one of a plurality of issue groups, depending on detection of register conflicts between micro-operations, the register conflicts concerning access to registers of a first register set; in which:
  the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
  the issue circuitry is configured to control issue of the micro-operations based on the issue groups, to prevent any instruction in a given issue group being issued until all micro-operations in any older issue group than the given issue group have been issued.

Further aspects, features and advantages of the present technique will be apparent from the following description of examples, which is to be read in conjunction with the accompanying drawings.

DESCRIPTION OF EXAMPLES

Figure 1:
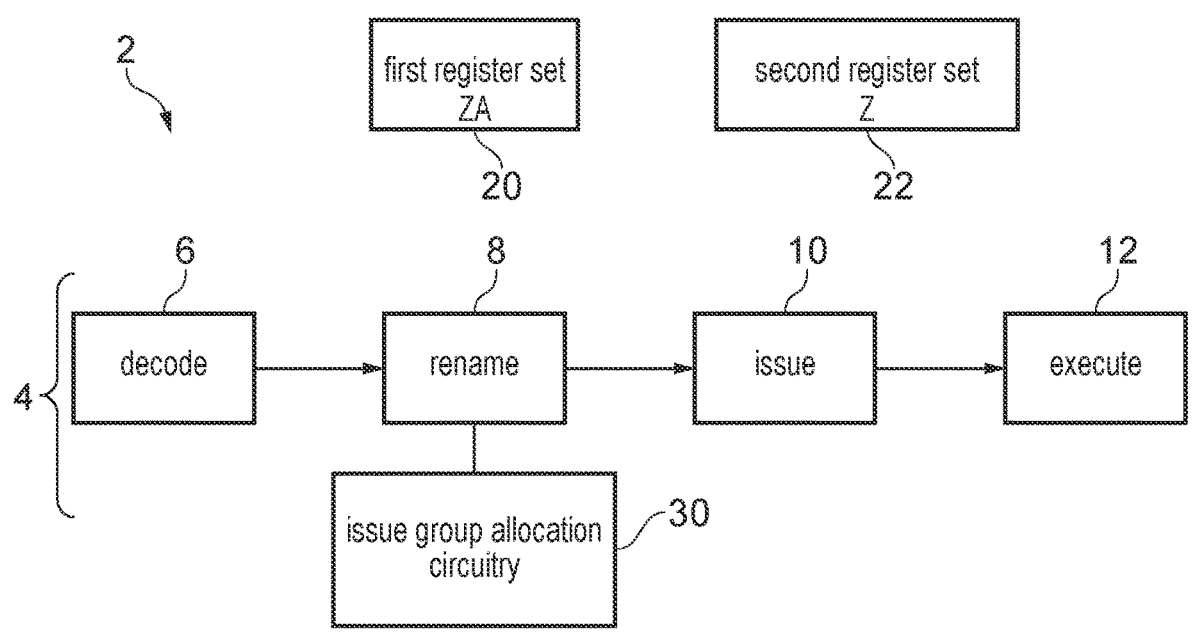
FIG. 1 illustrates an example of an apparatus comprising issue circuitry and issue group allocation circuitry.

An apparatus has issue circuitry for issuing micro-operations for execution. A micro-operation is a decoded instruction generated by decoding a program instruction defined according to an instruction set architecture. There can be a one-to-one, one-to-many or many-to-one mapping between program instructions and micro-operations, so in some cases a micro-operation may be the same as its corresponding program instruction, while other systems the micro-operation may be in a different format to the program instruction. Some implementations may support splitting a program instruction into two or more micro-operations or fusing two or more program instructions into a single micro-operation.

In a typical processing system, the issue circuitry may maintain an issue queue representing the pool of micro-operations available for issuing a given cycle, and in each cycle the issue circuitry may perform a number of register conflict checks between respective pairs of micro-operations from the issue queue, and control issue order so that if a pair of micro-operations are determined to conflict for access to the same register storage (e.g. based on read-after-write conflicts where one micro-operation reads a register written to by an older micro-operation), those micro-operations are issued in an order which gives the same outcome as if the micro-operations were executed in program order. Hence, register conflicts may limit the extent to which out-of-order execution is possible. At least micro-operations that are not conflicting may be executed out-of-order in a different order to the program order in which the corresponding program instructions are defined in the program being executed.

However, the inventors have recognised that for some types of register set used by the latest processors, it may be relatively expensive in terms of hardware costs to check for register conflicts for many pairs of micro-operations in each cycle. This may limit the size of the out-of-order execution window (number of micro-operations in the pool from which the next micro-operation to be issued is selected) which can be supported for a given power/circuit area budget, restricting performance by limiting the extent to which program instructions can be executed out of order. For example, the loss of performance may arise because sometimes the limited size of the out-of-order pool may mean that a stalled micro-operation could block any micro-operation being issued in a given cycle, whereas if the out-of-order pool was larger then there could have been a younger non-conflicting micro-operation available which could have issued ahead of the stalled micro-operation.

In the examples discussed below, issue group allocation circuitry is provided to control allocation of each micro-operation to one of a number of issue groups, depending on detection of register conflicts between micro-operations, the register conflicts relating to access to registers of a first register set. The issue group allocation circuitry may allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation. A register conflict may be considered to occur between two micro-operations if the issue group allocation circuitry detects there is a risk that the two micro-operations could require access to the same portion of the first register set. In practice, the information used by the issue group allocation circuitry to detect such register conflicts may be imprecise, so that false positive conflict detection is possible even if the two micro-operations would not actually have accessed the same portion of the register storage, or the tracking information may not distinguish between reads and write access to a given register so it may be that a register conflict between two micro-operations which read the same register is detected even though there is no intervening write to those registers and those micro-operations could have been processed out of order despite the conflict. Between two issue groups, the "younger" issue group may be considered to be the one of the two issue groups for which the first micro-operation allocated to that group is younger (later in program order) than the first micro-operation allocated to the other "older" issue group.

Hence, for the micro-operations assigned to the same group, those micro-operations are already pre-calculated by the issue group allocation circuitry as not having any register conflicts between them concerning access to the first register set, and so this greatly simplifies issue control by the issue circuitry, as the issue circuitry can issue the micro-operations within a given issue group in any order (depending on other factors affecting readiness to issue, such as whether there are any conflicts for access to another register set other than the first register set), while the issue circuitry is restricted to completing issue of all micro-operations in an older issue group before starting to issue any micro-operations from a younger issue group.

This approach will tend to reduce the number of occasions on which register access information (defining which registers of the first register set are required by a given micro-operation) needs to be decoded for a particular micro-operation, compared to an implementation which leaves it to the issue circuitry to decode the register access information and detect register conflicts. For example, for the purposes of register conflict detection, the register access information for each micro-operation may only need to be decoded once on assignment of the issue group, rather than multiple times across a number of cycles when in each cycle the issue circuitry checks the register access information of a number of micro-operations for the purpose of deciding based on register conflicts which micro-operation to issue next.

Therefore, the hardware cost of identifying register conflicts can be reduced, enabling a larger out-of-order execution window to be supported for a given power/circuit area budget, and hence helping to improve performance by increasing the likelihood a micro-operation can be issued if older micro-operations are stalled. For example, for a given power/circuit area budget, it has been found through simulation that this approach can improve average performance by approximately 17% when processing standard matrix processing benchmarks.

The issue group assignment is based on detecting register conflicts for at least a first register set. However, some examples may support more than one register set. It is not essential that the issue group assignment is dependent on register conflicts for all register sets. In some cases, two micro-operations may be assigned the same issue group even if they conflict for access to the same register of a second register set different to the first register set. For example, the second register set could be a register set for which detection of which portion of the second register set is accessed by a given micro-operation is simpler than for the first register set, so that the hardware cost of comparing second register set access information at the issue stage for respective pairs of micro-operations awaiting issue is cheaper than the hardware cost of comparing first register set access information defining which portions of the first register set are accessed by a micro-operation.

The first register set, for which detection of register conflicts between micro-operations influences the issue group assignment, may, in some examples, comprise array registers for storing a two-dimensional array of elements. In some examples, the first register set (e.g. the array registers) may be addressable in a plurality of different access patterns depending on micro-operation register access pattern information specified by a micro-operation which references the first register set. For example, array registers may be accessible as slices in either a horizontal dimension or vertical dimension of a two-dimensional array of elements, or can be accessible as "tiles" formed of a number of portions of elements selected from different portions of the array register storage at intervals of a certain stride offset. While such variety of access patterns can be helpful for implementing processing workloads involving matrix processing, for example, they greatly increase the complexity in decoding the micro-operation register access pattern information to identify which portions of the register storage are accessed by a given micro-operation. Therefore, the techniques discussed here regarding issue group assignment are particularly useful when applied to register conflicts involving such array registers and/or registers involving multiple different access patterns for accessing the same register storage.

In response to a register conflict being detected for the given micro-operation with respect to a youngest issue group that has been allocated at least one micro-operation, the issue group allocation circuitry is configured to start allocation for a next youngest issue group and allocate the given micro-operation to that next youngest issue group. Hence, a new younger group is started when the latest micro-operation to be assigned a group conflicts for access to the first register set with a group in the current youngest group.

When group-jumping is enabled, the issue group allocation circuitry may be capable of allocating the given micro-operation to an issue group older than a current youngest issue group. By supporting micro-operations being able to "jump the queue" by being assigned to an older group than the current youngest issue group, this can improve performance in some instances as it allows micro-operations with no conflict with that older group and any younger groups to be executed earlier where possible. This may reduce the likelihood that a younger micro-operation which could have been ready to issue in a younger issue group is stalled due to an older blocking micro-operation in an older issue group not being ready to issue yet.

More particularly, when group-jumping is enabled, the issue group allocation circuitry may allocate the given micro-operation to a selected issue group among a set of candidate issue groups for which each candidate issue group is an issue group for which neither that issue group nor any younger issue group has any register conflict with the given micro-operation, the selected issue group comprising the oldest of the set of candidate issue groups that is able to accept at least one further micro-operation in the issue group. Hence, this approach ensures that program order is respected among micro-operations that involve a register conflict concerning access to the register set, but when multiple candidate issue groups could accept the given micro-operation, selecting the oldest of the candidate issue groups will tend to improve performance by enabling the given micro-operation to be issued for execution earlier than if a younger candidate issue group was selected. Whether a given candidate issue group is able to accept at least one further micro-operation into the group may, in some instances, depend on whether the number of micro-operations already assigned the given candidate issue group is less than a maximum number of micro-operations per group.

Also, when identifying the candidate issue groups, each candidate issue group may be an issue group for which neither that candidate issue group nor any younger issue group has any register conflict with the given micro-operation for accesses to the first register set, and for which no younger issue group than that candidate issue group has a register conflict with the given micro-operation for accesses to a second register set. Hence, the issue group allocation circuitry may maintain, for each issue group, tracking information tracking which portions of the first register set and the second register set are accessed by the micro-operations allocated to that issue group. A given issue group could be considered a candidate issue group for being allocated the given micro-operation, even if the given issue group does include a micro-operation which has a conflict with the given micro-operation for access to the second register set, provided the given issue group does not contain any micro-operation having a conflict with the given micro-operation for access to the first register set and all the younger issue groups do not contain any micro-operation having a conflict with the given micro-operation for access to the second register set. Although, as noted above, conflicts regarding access to the second register set can be left for the issue circuitry to identify and manage and so it is not necessary for such conflicts regarding access to the second register set to prevent allocation of two micro-operations which conflict for access to the second register set to the same allocation group, the inventors recognised that nevertheless it is useful, for avoiding deadlock, to ensure that two micro-operations which conflict for access to the second register set are not assigned to issue groups such that the younger of the micro-operations accessing a given register of the second register set is in an older issue group than the older of the micro-operations accessing that given register of the second register set. Hence, by tracking which registers of the second register set are accessed by micro-operations already assigned to each group, and selecting candidate issue groups for which there is no younger issue group which has a register conflict with the given micro-operation for accesses to the second register set, the risk of deadlock can be reduced.

Some implementations may always enable group-jumping, by design, so that the group-jumping is considered permanently enabled.

However, other examples may vary the extent to which group jumping is possible. In some examples, this may be a binary decision of whether to enable or disable group jumping. In other examples, the amount by which group jumping is possible while enabled can further be dynamically varied, e.g. varying the maximum number of groups ahead of the youngest group by which a given micro-operation can jump the queue).

Hence, the issue circuitry may provide jump preference information, and the issue group allocation circuitry may control an extent to which group-jumping is enabled based on the jump preference information. This allows the extent to which group-jumping is enabled to vary based on observations made by the issue circuitry on whether group-jumping is causing any adverse performance effect. For example, as all micro-operations from an older group would need to issue before any micro-operations from a younger issue group can issue, if a given micro-operation is jumped too far up the queue this could risk holding back other micro-operations assigned to a younger group which may already be ready to issue. The issue circuitry can determine the jump preference information based on detection of such scenarios, and the jump preference information can control the extent to which the issue group allocation circuitry permits jumping of micro-operations up the queue to be assigned to an issue group other than the youngest issue group.

More particularly, the issue group allocation circuitry may control, based on the jump preference information, a maximum number of occupied issue groups already allocated with at least one micro-operation which are not yet in an issuing state in which the issue circuitry is able to issue micro-operations from that issue group. If the maximum number of occupied issue groups is set to 1 then group jumping becomes disabled. If the maximum number of occupied issue groups is greater than 1, then group jumping becomes enabled. Further control on the extent to which group jumping is possible can be implemented by adjusting the maximum number of occupied issue groups to various numbers greater than 1 (so that when the maximum number of occupied issue groups is 4, say, then a greater extent of group jumping is possible than when the maximum number of occupied issue groups is 2 or 3, since a given micro-operation can now jump a greater number of groups ahead of the youngest occupied issue group at the time of allocating an issue group to that given micro-operation). In some examples, the jump preference information could explicitly indicate the maximum number of occupied issue groups to be permitted by the issue group allocation circuitry. However, in other examples the jump preference information may specify information used by the issue group allocation circuitry to set the maximum number of occupied issue groups. For example, the jump preference information could indicate a request to increase or decrease the maximum number of occupied issue groups.

The jump preference information can also control whether jumping is enabled/disabled at all. For example, a jump confidence value provided by the issue circuitry may be compared with a threshold to determine whether the issue group allocation circuitry should enable or disable group-jumping.

In some examples, the issue circuitry is configured to adjust the jump preference information based on detection of instances when a first micro-operation not yet ready to issue in an older issue group is blocking issue of a second micro-operation in a younger issue group which, other than awaiting issuing of all micro-operations for the older issue group, is ready to issue. Such scenarios can be helpful clues as to whether the current amount of group jumping permitted is helpful or harmful to processing performance.

In particular, the issue circuitry could adjust the jump preference information to indicate an increased preference for group-jumping in response to detecting that the first micro-operation is a non-jumped micro-operation which was allocated to either (i) the youngest issue group available at the time of issue group assignment for the first micro-operation, or (ii) a newly started next-youngest issue group started due to the first micro-operation being found to have a register conflict with another micro-operation in the issue group which was currently the youngest issue group prior to issue group assignment for the first micro-operation. In general, by increasing jump preference when a younger micro-operation is ready to issue but blocked by an older non-jumped micro-operation in an older issue group, then this will tend to increase the likelihood that the younger micro-operation could jump the queue in future and so be allocated to an older issue group so that it can be executed sooner, improving performance.

On the other hand, the issue circuitry could adjust the jump preference information to indicate a decreased preference for group-jumping in response to detecting that the first micro-operation is a jumped micro-operation which was allocated to an older issue group than the youngest issue group available at the time of issue group assignment for the first micro-operation.

Whether a given micro-operation is a jumped micro-operation or non-jumped micro-operation can be detected by the issue circuitry based on a "jumped" status tag provided by the issue group assignment circuitry to the issue circuitry along with a micro-operation awaiting issue. Hence, when a younger micro-operation is ready to issue but blocked by a jumped micro-operation in an older issue group, this will tend to indicate that the jumped micro-operation was jumped too far up the queue, and so a lower preference for jumping may be more appropriate in future.

Either way, by considering feedback from the issue stage on whether jumped/non-jumped micro-operations are blocking micro-operations in younger issue groups, and dynamically modifying the extent to which jumping is permitted (e.g. by varying the maximum number of occupied issue groups permitted at a given time), this can help to improve the average-case performance achieved.

The issue group allocation circuitry may maintain a plurality of issue group tracking entries, each issue group tracking entry being associated with a corresponding issue group and tracking a status of the corresponding issue group, the status being specified as one of free, occupied and issuing. The issue group allocation circuitry is configured to detect register conflicts based on the issue group tracking entries for which the status is specified as occupied. The issue circuitry is configured to defer issuing of a given instruction until after the status of the issue group to which the given instruction is allocated has become issuing. The issue group status may be useful for determining which issue groups can be allocated with a given micro-operation by the issue group assignment circuitry and which micro-operations can be issued by the issue circuitry.

Each issue group tracking entry may specify group register access pattern information specifying which of a plurality of portions of a first register set are accessed by any one or more micro-operations allocated to the corresponding issue group, and the issue group allocation circuitry may detect register conflicts between the given micro-operation and one or more micro-operations of a given issue group based on micro-operation register access pattern information specified by the given micro-operation and the group register access pattern information specified by the issue group tracking entry for the given issue group. The group register access pattern information can be imprecise, e.g. tracking access to portions of the first register set at a relatively coarse granularity, so that false positive register conflicts are possible where two micro-operations are detected as conflicting because the group register access pattern information identifies them as accessing the same portion of the first register set, even if those two micro-operations would actually have accessed different sub-portions of that portion of the first register set. A relatively coarse-grained tracking may be sufficient to eliminate register conflicts, and can be more efficient than a precise tracking scheme in terms of circuit overhead and power consumption.

To allow for the deadlock-avoidance detection mentioned above based on detecting accesses to a second register set, each issue group tracking entry may also specify second register set group register access pattern information for tracking accesses to the second register set by the micro-operations assigned to the corresponding issue group, separate from the first register set group register access pattern information which tracks accesses to the first register set by the micro-operations assigned to the corresponding issue group.

The issue group allocation circuitry may switch an oldest occupied issue group from occupied to issuing in response to detecting at least one of: the group register access pattern information for the oldest occupied issue group indicating that every one of the plurality of portions is accessed by at least one micro-operation allocated to the oldest occupied issue group; and a number of micro-operations allocated to the oldest occupied issue group having reached a maximum number of micro-operations allowed in one group. Hence, when a given issue group becomes full (either reaching the maximum number of micro-operations permitted in one group, or having fully covered every portion of the first register set so that any younger micro-operation would by definition be detected as conflicting with an existing micro-operation in the given issue group), then there is no longer any benefit in waiting to see if other micro-operations can be grouped into that group, and so provided that issue group has become the oldest occupied issue group, the micro-operations of that issue group can start being issued by the issue circuitry (subject to completion of issuing of micro-operations from any older issue group). When an issue group is switched from occupied to issuing, the details of the issue group (e.g. number of micro-operations in the group) may be synchronized with the issue circuitry so that the issue circuitry is informed that it can start issuing micro-operations assigned to that issue group.

It can also be useful for the issue group allocation circuitry to switch an oldest occupied issue group from occupied to issuing in response to a starvation signal received from the issue circuitry indicative of the issue circuitry being starved of micro-operations available to issue in a current processing cycle. With this approach, even if the oldest occupied issue group could have accepted at least one further micro-operation and has not yet fully covered every portion of the first register set, it can be useful to start issuing micro-operations from the oldest occupied issue group so that the issue circuitry can maintain forward progress. This helps improve performance by reducing the risk that the issue circuitry runs out of micro-operations to issue.

Delay circuitry can be provided to delay transfer of the starvation signal for at least one processing cycle between transmission by the issue circuitry and receipt by the issue group allocation circuitry. It may be counter-intuitive that it would be beneficial to delay the transfer of the starvation signal, as on first glance this would appear to delay the response of the issue group allocation circuitry to an indication that the issue circuitry is starved of micro-operations to issue, increasingly the likelihood that there may be bubbles in the pipeline when the issue circuitry has no micro-operations available to issue. However, the inventors have recognised that, without this delay circuitry, there is a risk that the micro-operation execution could become serialized, removing the ability to execute micro-operations out of order, since otherwise following a reset (when the issue circuitry would by definition be starved or micro-operations to issue), the starvation signal would immediately be asserted and reach the issue group allocation circuitry causing the issue group allocation circuitry to stop allocating further micro-operations to the oldest issue group following the first micro-operation being allocated to that group. As this could then cause each issue group to comprise only a single micro-operation, this would harm performance by forcing in-order execution of the micro-operations. By providing the delay circuitry to delay the transfer of the starvation signal for at least one processing cycle on the way to the issue group allocation circuitry, this gives time for at least two micro-operations to be grouped into the oldest issue group created following a reset, and hence enables out-of-order processing to be possible, improving performance by allowing younger micro-operations to issue ahead of an older micro-operation that is stalled.

Another scenario when the issue group allocation circuitry may switch an oldest occupied issue group from occupied to issuing may be in response to detecting that a number of occupied issue groups has reached a maximum number of occupied issue groups and a new occupied issue group is to be allocated due to a register conflict being detected between the given micro-operation and a current youngest issue group. As mentioned above, limiting the number of occupied issue groups to a particular maximum number can be helpful to enable dynamic scaling of the extent to which micro-operations can "queue-jump".

Specific examples will now be described with reference to the drawings.

FIG. 1 schematically illustrates a portion of a data processing apparatus 2, for example part of an out-of-order processor capable of out-of-order execution of micro-operations in an order different to the program order in which the corresponding program instructions from which the micro-operations are decoded appear in a program being executed. The apparatus 2 comprises a processing pipeline 4 comprising a number of pipeline stages, including at least:

- a decode stage 6 for decoding program instructions to generate micro-operations (for some instructions, based on a one-to-one mapping of program instructions to micro-operations, and for other instructions based on a one-to-many or many-to-one mapping of program instructions to micro-operations);
- a rename stage 8 for performing register renaming to map architectural registers specified by the program instructions to physical registers provided in hardware;
- an issue stage 10 for determining when a given micro-operation is ready to issue, depending on assessment of register conflicts with respect to other micro-operations; and
- an execute stage 12 for executing data processing operations in response to the issued micro-operations.

It will be appreciated that FIG. 1 does not show all of the pipeline stages of the pipeline 4 (e.g. further stages could include a fetch stage prior to decode for fetching instructions for processing, or a backpressure stage between the issue stage 10 and execute stage 12 for applying backpressure to reduce supply rate of micro-operations from earlier stages if the execute stage 12 cannot handle further micro-operations than have been assigned to the execute stage already).

In the apparatus 2, the instructions decoded by the decode stage 6 are defined according to an instruction set architecture which supports at least two register sets: a first register set 20 comprising array registers (ZA registers) used to store portions of two-dimensional data structures such as matrices, and a second register set 22, which in this example is a set of vector registers (Z registers), each vector register providing a vector of data elements representing a one-dimensional data structure or a single slice through a two-dimensional data structure.

Figure 2:
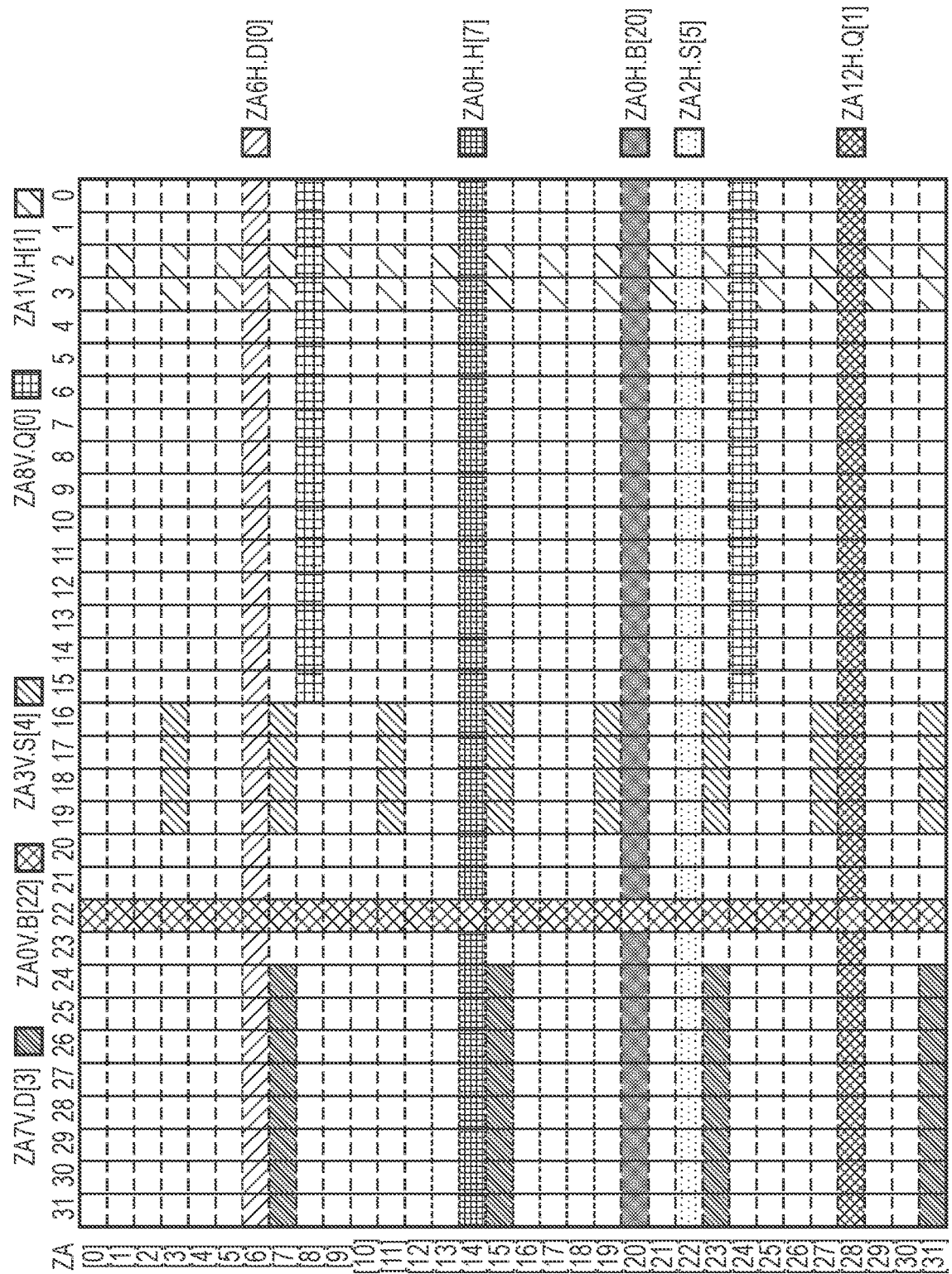
FIG. 2 illustrates an example of a first register set supporting a variety of access patterns.

FIG. 2 shows a portion of the array registers in more detail. Each small box within FIG. 2 represents one data element of a given size (e.g. 8, 16, 32 or 64 bits). In the example of FIG. 2, 32 array registers ZA[0] to ZA[31] are provided, which are addressable in a wide variety of ways as shown:

in the examples ZA6H.D[0], ZA0H.H[7], ZA2H.S[5], ZA12H.Q[1] a horizontal slice of data from a single array register ZA[i] is accessible as a vector operand, with different sized vector element sizes denoted by the .D, .H, .S, .Q notation;

in the example ZA0V.B[22], a vertical slice of data from a given column position within each of the 32 ZA registers ZA[0] to ZA[31] is accessible as a vector operand. Again, it would be possible to provide different data element sizes for the vector operand accessed as a vertical slice, similar to the horizontal slices shown for FIG. 2.

As shown in examples ZA7V.D[3], ZA3V.S[4], ZA1V.H [1], ZA8V.Q[0], it is also possible to access, as a single vector operand, a tile of elements where each portion of the tile is extracted from a different one of the ZA registers ZA[0] to ZA[31]. For example, ZA7V.D[3] comprises 4 sets of 8 elements selected from column positions [31:24] of each of ZA[7], ZA[15], ZA[23], ZA[31]; ZA3V.S[4] comprises 8 sets of 4 elements selected from column positions [19:16] of each of ZA[3], ZA[7], ZA[11], ZA[15], ZA[19], ZA[23], ZA[27] and ZA[31]; ZA1V.H[1] comprises 16 sets of 2 elements selected from column positions [3:2] of each of the odd-numbered ZA registers, and ZA8V.Q[0] comprises two sets of 16 elements selected from column positions [15:0] of ZA[8] and ZA[24] respectively.

Typical issue control mechanisms for an out-of-order processor would normally rely on the issue stage 10 maintaining a queue of micro-operations available for issue, each associated with the corresponding register access information, and checking in every cycle for register hazards between respective pairs of micro-operations in the queue, by comparing the register access information of those micro-operations, so that micro-operations which conflict for access to the same registers can be ensured to be issued in an order which gives the same result as if the micro-operations were executed in an order corresponding to the program order in which the corresponding program instructions are defined in the program being executed. However, for the array registers 20, given the wide variety of addressing patterns available as shown in FIG. 2, it can be relatively complex to determine, based on register access information specified by a given micro-operation, which portions of the ZA array register storage are accessed by that micro-operation. Therefore, applying standard issue control schemes when requiring checks for register conflicts involving the array registers 20 can incur too high a hardware overhead. In practice, this overhead may be limited by reducing the size of the out-of-order execution window (reducing the number of micro-operations in a pool from which the next micro-operation to be issued can be selected), to limit the number of pairs of micro-operations for which register conflicts have to be checked in each cycle. However, reducing the size of the out-of-order execution window would limit performance as there is less opportunity for reordering and so a greater chance that an older stalled micro-operation prevents any younger micro-operation from being able to issue ahead of the older stalled micro-operation.

Instead, as shown in FIG. 1, issue group allocation circuitry 30 is provided, for example in association with the rename stage 8 at which architectural registers corresponding to the first register set 20 are mapped to physical registers within a physical register file. While the example of FIG. 1 provides the issue group allocation circuitry 30 at the rename stage 8, other examples could allocate issue groups at a different stage of the pipeline prior to the issue stage 10. In practice, however, the rename stage 8 can be a convenient stage to control issue group allocation because the register renaming performed by the rename stage may have eliminated some false register conflicts by mapping some instances of the same architectural register onto different physical registers, so it may be desirable to perform the issue group allocation based on detection of register conflicts based on the physical register specifiers of registers accessed by the micro-operations.

In general, the issue group allocation circuitry 30 allocates micro-operations to one of a number of issue groups, with each issue group being allocated with micro-operations so that any two micro-operations in the same issue group cannot have any conflict for access to the first register set 20. This then allows the issue circuitry 10 to control out-of-order issue of the micro-operations based on the issue groups, with all micro-operations from an older issue group being issued before any micro-operation can be issued from a younger issue group, and the micro-operations within an issue group being issuable in any order relative to each other (subject to other factors which may control a micro-operation's readiness to issue, such as whether there is any conflict for access to other register sets such as the second register set 22, whose conflicts may not necessarily be checked when assigning the issue groups). With this approach, the number of cycles in which a given micro-operation's register access information has to be decoded to identify which portions of the first register set 20 it will access can be reduced, as for the purpose of issue control each micro-operation may only need its register access information decoded once when an issue group is assigned to the micro-operation, rather than multiple times across a number of cycles during which the micro-operation is resident in an issue queue, as might be the case for other more traditional out-of-order issue control schemes.

Figure 3:
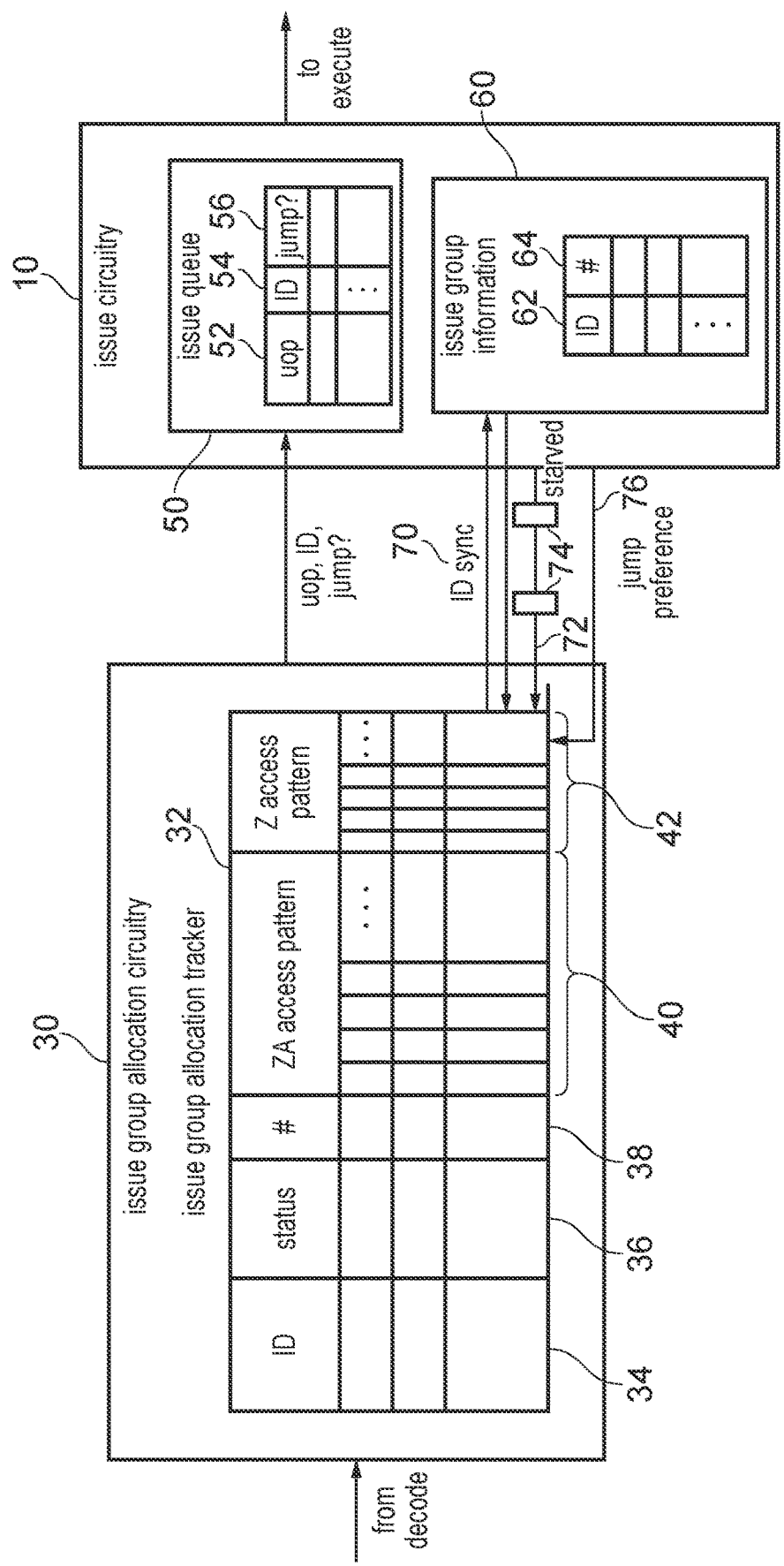
FIG. 3 illustrates the issue group allocation circuitry and issue circuitry in more detail.

FIG. 3 illustrates the issue group allocation circuitry 30 and issue circuitry 10 in more detail. The issue group allocation circuitry 30 receives the stream of micro-operations decoded by the decode stage 6, and for each micro-operation (processed by the issue group allocation circuitry in an order corresponding to program order), assigns one of a number of issue groups to each micro-operation, each issue group having an associated issue group identifier (ID). The issue group allocation circuitry 30 maintains an issue group allocation tracking data structure 32 which comprises a number of tracking entries, each tracking entry corresponding to a respective issue group having a corresponding issue ID. The tracking entry for a given issue group includes:

the issue group ID 34 of the given issue group. In some examples, it may not be necessary to explicitly specify the issue group ID 34 in the tracking entry, as the issue group ID might be implicit from the relative position of the tracking entry within the tracking structure. However, in some examples it can be helpful to explicitly store the issue group ID (e.g. to allow a tracking structure with fewer entries to be shared among a larger number of group IDs, as at any given time a certain number of IDs may correspond to "Free" issue groups which do not have any valid information to store).

an issue group status 36, indicating the status of the given issue group as one of:

"Free": there are no micro-operations currently assigned to the issue group. The issue group is available for allocation to new micro-operations if a conflict associated with the current youngest issue group is detected.

"Occupied": the issue group has been assigned at least one micro-operation, but has not yet been synchronised with the issue stage 10 to enable the issue stage to start issuing micro-operations from the issue group. While the issue group remains in the "Occupied" status, further micro-operations may be assigned to the group. Hence, it is helpful for each issue group to remain as "Occupied" for a time, to allow for gathering of multiple micro-operations into the group which can then be issued for execution out-of-order relative to each other (whereas micro-operations in different issue groups are serialised based on the age of the respective issue groups to which those micro-operations are allocated).

"Issuing": the issue group has already been synchronised with the issue stage 10 to enable the issue stage to issue micro-operations from the issue group once any older issue groups have completed issuing all of their micro-operations. No further micro-operations are assigned to an issue group that has the "issuing" status.

a micro-operation count value 38 indicating how many micro-operations have been assigned to the given issue group.

an array register access pattern field (ZA access portion) 40 comprising a number of ZA portion indicators, each portion indicator corresponding to a respective portion of the ZA register set 20 and indicating whether any micro-operation assigned to the given issue group requires access to the corresponding portion of the ZA register set. The portion indicators may be defined on a coarse-grained basis, e.g. with each portion corresponding to a subset of the ZA registers ZA[0] to ZA[32] shown in FIG. 2. Given the strided tile access patterns supported as shown in FIG. 2, it can be helpful for each portion indicator to correspond to a set of non-contiguous ZA registers. For example, the portion indicators may include a first portion indicator set if a micro-operation in the given issue group requires access to any of ZA[0], ZA[8], ZA[16], ZA[24], a second portion indicator set if a micro-operation in the given issue group requires access to any of ZA[1], ZA[9], ZA[17], ZA[25], and so on for other portion indicators. It will be appreciated that the particular mapping of portions of the array register storage onto the respective portion indicators can vary depending on implementation choice.

a vector register access pattern field (Z access portion) 42, comprising a number of Z portion indicators, each portion indicator corresponding to a respective portion of the vector register set 22 and indicating whether any micro-operation assigned to the given issue group requires access to the corresponding portion of the vector register set 22. Again, the portion indicators can be defined at a relatively coarse granularity, e.g. each portion indicator corresponding to a subset of two or more of the vector registers. As mentioned earlier, although the group assignment is primarily based on detecting conflicts concerning access to the array register set 20, it can be useful to also consider, to a limited extent, access to another register set, such as the vector register storage 22, to reduce the risk of deadlock which could arise if an older micro-operation in program order was assigned to a younger issue group than a younger micro-operation that conflicts for access to the vector registers 22 with the older micro-operation.

It will be appreciated that other information, not shown in the example FIG. 3, could also be stored in the entry for a given issue group.

Once an issue group has been assigned to a given micro-operation, the ID of that issue group is specified as a tag which passes to the issue stage 10 along with the micro-operation itself. The micro-operation may also be tagged with a "jump" status tag which identifies whether the micro-operation has "jumped" the queue. A jumped micro-operation is one which has been allocated to an older issue group than the issue group which was the youngest "occupied" issue group at the time when the issue group assignment is performed for that micro-operation. The issue circuitry 10 maintains an issue queue 50 which comprises a number of issue queue slots, each issue queue slot for storing a corresponding micro-operation 52 awaiting issue together with its issue group ID 54 and jump status tag 56. Each issue queue slot could also record other information not shown in FIG. 3 (e.g. including vector register access pattern information indicating which vector registers 22 are required by the micro-operation, for the purpose of checking for register hazards involving accesses to the vector registers 22).

The issue circuitry 10 also maintains an issue group information tracking structure 60 for recording, for each issue group which has reached the "issuing" status, the issue group ID 62 of that issue group and a remaining micro-operations count value 64 tracking how many micro-operations are still to be issued from that issue group. The issue circuitry 10 can use the issue group information tracking structure 60 to determine which issue groups of micro-operations can be issued next.

An issue group synchronisation path 70 is provided for synchronising issue group information between the issue group allocation circuitry 30 and the issue circuitry 10. As discussed further with respect to FIGS. 5 and 6 below, various events can trigger the issue group allocation circuitry 30 to update the status 36 of the oldest "occupied" issue group from "occupied" to "issuing", and when an issue group reaches the "issuing" status, the issue group ID 34 and number of micro-operations 38 in the group are synchronised with the issue circuitry 10 and used to populate the corresponding fields 62, 64 in the issue circuitry's issue group information status tracker 60. It is not necessary for the status field 36 or the register access pattern information 40, 42 of the issue group allocation tracking entry for the synchronised issue group to be shared with the issue circuitry 10.

Similarly, once all micro-operations from a given issue group that has reached the "issuing" status have been issued by the issue circuitry 10 (i.e. the remaining micro-operation count value 64 has become zero for a given issue group ID 62), the issue circuitry 10 can output on the synchronisation path 70 the ID of the issue group that has finished issuing, and this may prompt the issue group allocation circuitry 30 to set the status 36 of that issue group to "Free".

The transfer of micro-operations to the issue queue 50 does not depend on the corresponding issue group already having reached the "Issuing" status. Subject to there being a free issue slot in the issue queue 50, a given micro-operation may be sent to the issue queue 50 as soon as its issue group ID 54 has been assigned, while the status of that issue group remains as "Occupied". If there is no free issue slot, backpressure from the issue circuitry 10 may cause the issue group allocation circuitry 30 to stall allocation of issue groups to micro-operations.

However, even though the issue queue 50 may contain a slot containing a valid micro-operation specifying a given issue group ID, the issue circuitry 10 will not issue that micro-operation for execution until the issue group allocation circuitry 30 has synchronised the corresponding issue group with the issue circuitry 10 upon that issue group having been switched to the "Issuing" status, and also the issue circuitry 10 will not issue that micro-operation until all micro-operations associated with any older issue groups have issued. The issue group IDs have a certain known allocation sequence (e.g. 0, 1, 2, . . . , ID-max, 0, 1, 2, . . . . ID-max, 0, 1, 2 . . . and so on), which allows the issue group allocation circuitry 30 and issue circuitry 10 to detect at a given time which issue group IDs are the oldest.

The issue circuitry 10 may monitor the number of issuable micro-operations available for issue in each group, based on the remaining micro-operation count value 64 associated with the oldest remaining issue group ID that has at least one micro-operation still to issue, and may issue a starvation signal 72 if the number of micro-operations available for issue is less than a threshold (e.g. if there are no micro-operations awaiting issue at all). The starvation signal 72 can be used to prompt the issue group allocation circuitry 30 to switch its oldest "occupied" issue group from "occupied" to "issuing" so that more micro-operations can be enabled for being issued. The starvation signal 72 may pass through at least one delay element 74 (e.g. a flip-flop) as it is transmitted from the issue circuitry 10 to the issue group allocation circuitry, to ensure that following a reset (when by definition there would be no micro-operations available for issue), at least one cycle delay is introduced before the oldest group is switched to "issuing", to allow time to gather multiple micro-operations into an issue group to enable some window of out-of-order execution. Otherwise, it could happen that in every cycle the issue group allocation circuitry 30 synchronises the next oldest issue group with the issue circuitry 10 as soon as it has been allocated a single micro-operation, so that each issue group ends up including only a single micro-operation, which would serialise execution to be fully in program order.

As discussed in more detail with respect to FIG. 8 below, the issue circuitry 10 can also issue a jump preference signal 76 to the issue group allocation circuitry 30, which is used by the issue group allocation circuitry 30 to limit the maximum number of tracking entries which are allowed to have their status 36 as "occupied" at a given time. This helps dynamically adjust the extent to which a micro-operation can "jump" the queue to be allocated to an older group than the youngest occupied issue group. The jump preference signal 76 is generated based on analysis of whether, when a micro-operation is not yet ready to issue in the oldest "issuing" issue group but is blocking at least one ready-to-issue micro-operation from being issued in a younger issue group, that blocking is an artefact of too much queue jumping (e.g. if the micro-operation causing the blocking is a "jumped" micro-operation for which the jump tag 56 identifies that the micro-operation jumped the queue) or is an artefact of not enough queue jumping (e.g. if the micro-operation causing the blocking is a "non-jumped" micro-operation for which the jump tag 56 identifies that the micro-operation did not jump the queue, which is a hint that in future a greater amount of queue jumping might have been helpful to allow the micro-operation in the younger issue group that was blocked to jump up to an older issue group).

Figure 4:
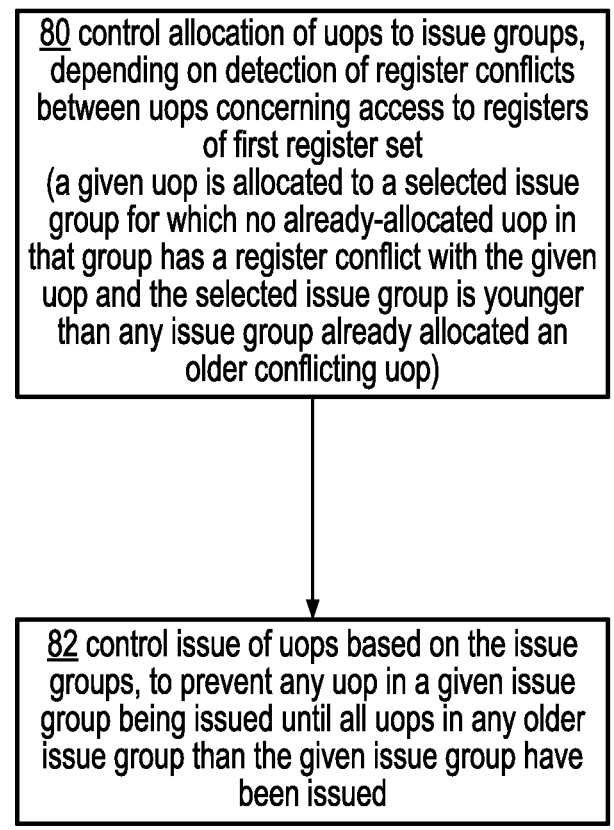
FIG. 4 illustrates steps for controlling issue of micro-operations based on issue groups.

FIG. 4 illustrates steps for controlling issue of micro-operations based on detection of register conflicts for registers of a first register set (e.g. the array registers 20). At step 80, the issue group allocation circuitry 30 controls allocation of micro-operations to respective issue groups, depending on detection of register conflicts between micro-operations concerning access to registers of the first register set 20. A given micro-operation is allocated to a selected issue group for which no already-allocated micro-operation in that group has a register conflict with the given micro-operation and the selected issue group is younger than any issue group already allocated an older conflicting micro-operation which has a register conflict for the first register set with the given micro-operation. At step 82, the issue circuitry 10 controls issue of micro-operations based on the issue groups, to prevent any micro-operation in a given issue group from being issued until all micro-operations in any older issue group than the given issue group have been issued.

Figure 5:
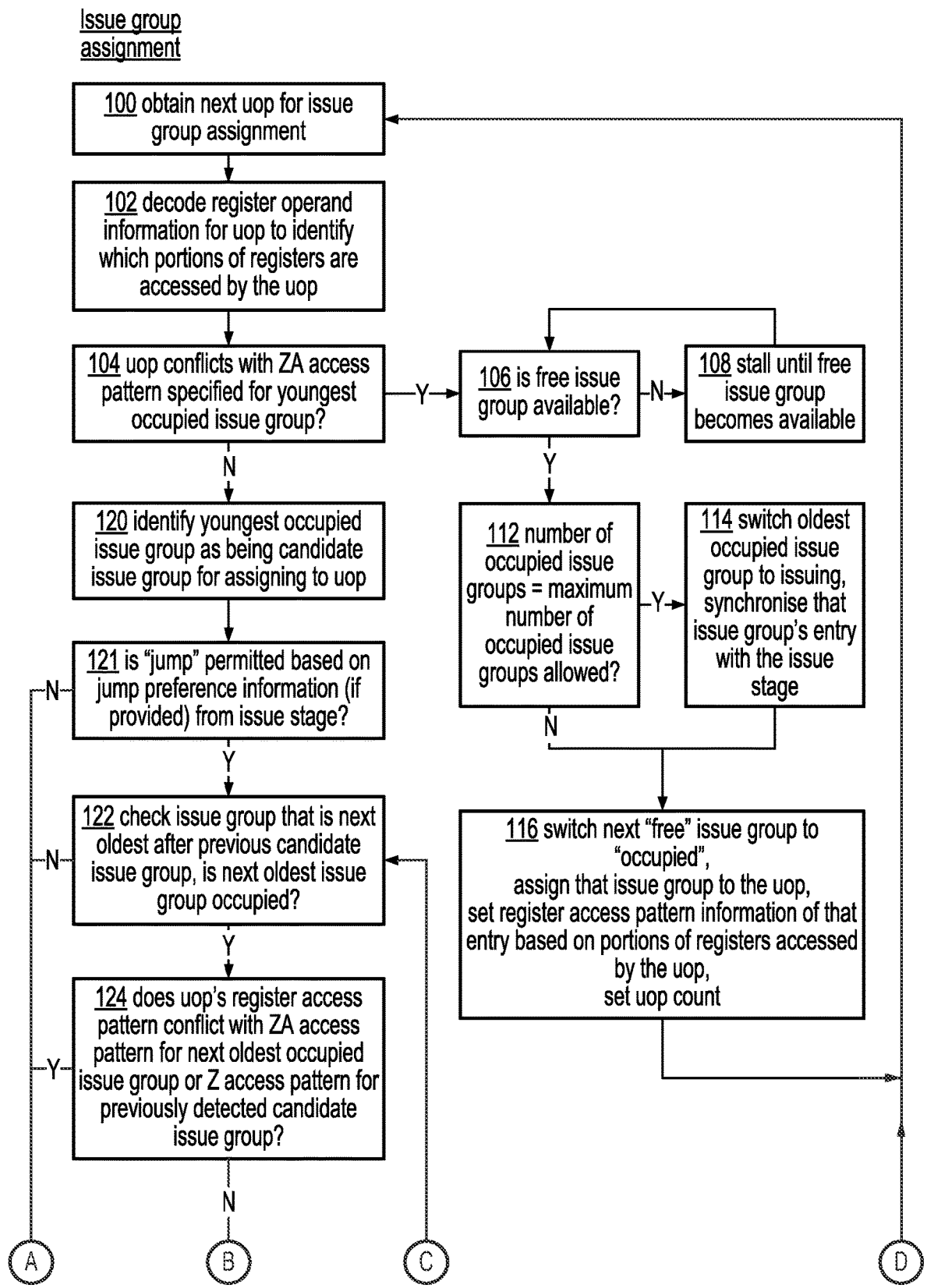
FIG. 5 illustrates in more detail steps for issue group assignment.
Figure 5:
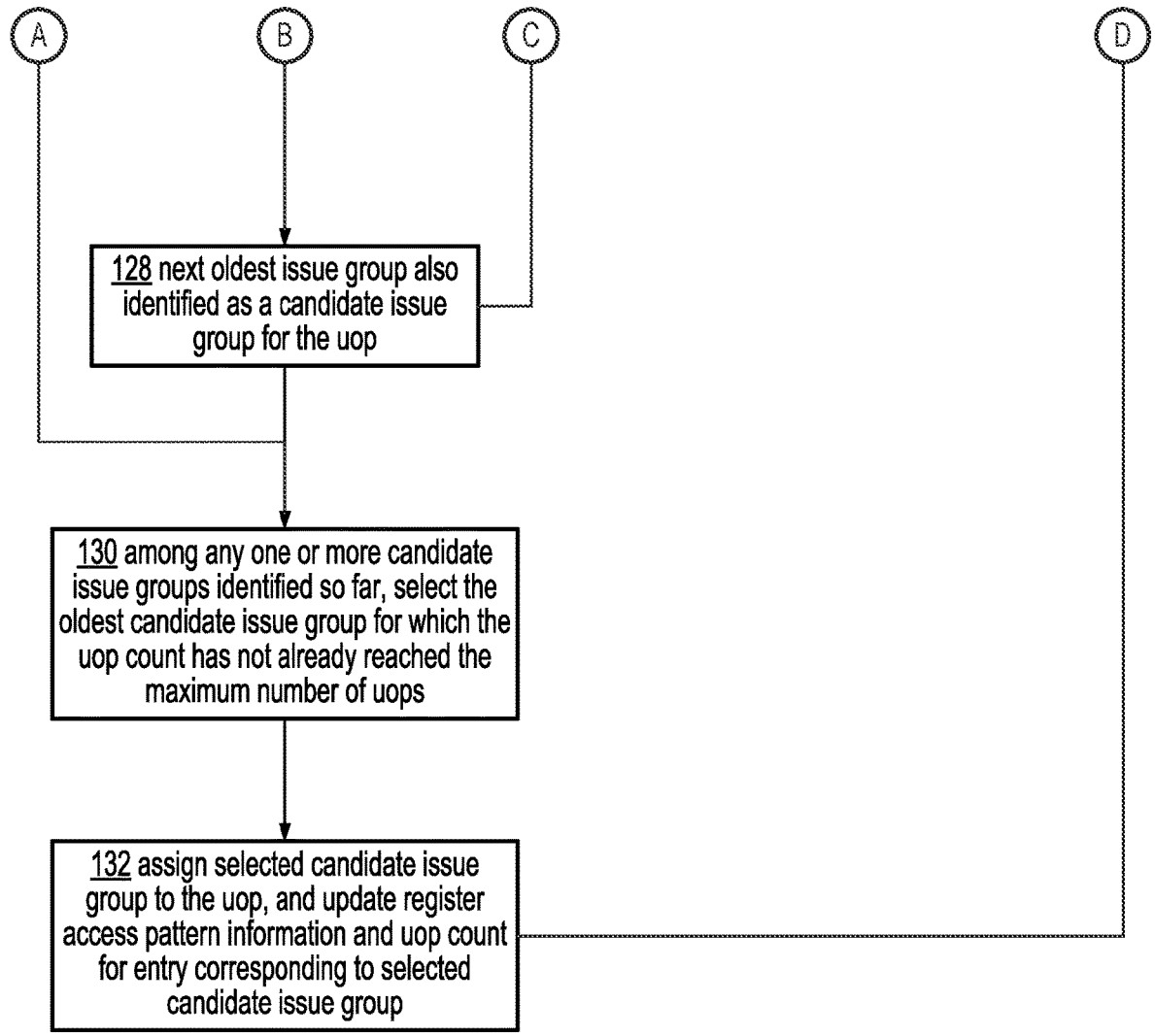

FIG. 5 illustrates steps showing in more detail a process for assigning an issue group to a given micro-operation. At step 100, the issue group allocation circuitry 30 obtains, as a given micro-operation for which issue group assignment is to be performed, the next micro-operation in program order for which the issue group assignment has not yet been performed. For the purpose of issue group assignment, micro-operations are processed in program order (e.g. the order in which the micro-operations are decoded by the decode circuitry 6). At step 102, the issue group allocation circuitry 30 decodes the register operand information for the given micro-operation which identifies which portions of the first and second register sets 20, 22 are accessed by the given micro-operation.

At step 104, the issue group allocation circuitry 30 determines whether the given micro-operation conflicts with the pattern of access to the first register set 20 indicated by the ZA access pattern information 40 stored in the tracking structure 32 for the youngest "occupied" issue group. In general, the youngest occupied issue group may be the issue group that was least recently allocated its first micro-operation to switch from "Free" to "Occupied". For example, the issue group allocation circuitry may maintain a youngest group tracking indicator which tracks which issue group ID is currently considered the "youngest". As groups become allocated with micro-operations, the youngest issue group will tend to cycle through the available issue group IDs in a certain allocation sequence (e.g. in ascending order of issue group ID, apart from at the point when the next allocation is to issue group ID=0 after the youngest issue group was previously the issue group with the maximum value of issue group ID). A conflict is detected based on the ZA access pattern information 40 if any of the portion indicators which correspond to portions of the array registers 20 required by the given micro-operation are set to indicate that a micro-operation already allocated to the youngest occupied issue group also requires access to the same portion of the array registers 20 as the given micro-operation. This conflict detection could be a false positive, as the portion indicators are tracked at a coarse-grained basis and so actually the given micro-operation might access a different sub-portion in the same portion as the sub-portion accessed by the micro-operation previously assigned to the group, but the granularity of tracking may be insufficient to differentiate such accesses to different sub-portions within the same portion of the array registers 20. There is no need to identify which particular earlier micro-operation in the youngest occupied issue group is the operation which conflicts with the given micro-operation for which group assignment is currently being performed-if multiple micro-operations have previously been allocated to the group, it is sufficient than any of those micro-operations could have conflicted with the given micro-operation. The ZA access pattern information 40 represents the set of portions of the array registers 20 that are collectively accessed by any of the micro-operations in the issue group.

If step 104 determines, based on checking the ZA access pattern information 40, that the given micro-operation does have a ZA register conflict with an existing member of the youngest occupied issue group, then the given micro-operation is to be allocated to a newly started younger issue group. At step 106, the issue group allocation circuitry 30 determines whether an issue group is available having the current status as "Free"-in particular the issue group allocation circuitry 30 checks the status field 36 for the next group ID in the allocation sequence after the group ID which is currently the youngest occupied issue group. If there is no free issue group available (i.e. all the available issue group IDs are either "occupied" or "issuing"), then at step 108, group assignment is stalled until a free issue group becomes available (which will happen once all micro-operations from the oldest issue group have been issued by the issue circuitry 10). Once a free issue group is available, then at step 112 the issue group allocation circuitry 30 determines whether the current number of occupied issue groups (issue groups for which the group status 36 is specified as the "occupied" status) has reached a maximum number of allowed "occupied" issue groups. If so, then at step 114 the oldest issue group currently having the "occupied" status is switched to the "issuing" status, and that issue group's entry is synchronised with the issue circuitry 10, providing the ID 62 and number of micro-operations 64 associated with that issue group to the issue circuitry 10 to enable the issue circuitry 10 to populate its ID tracker 60 so that once any older groups having finished issuing, the issue circuitry 10 can start issuing micro-operations from that issue group. Limiting the maximum number of entries that can be "occupied" at a given time is helpful to limit the extent to which micro-operations can "queue-jump" to be allocated to an older group than the youngest occupied group available at the time of issue group assignment for that micro-operation, to mitigate against potential adverse effects of enabling micro-operations to jump too large a number of groups ahead of the youngest available group, which can be harmful to performance if this causes a micro-operation in an older group to remain unready-to-issue for a long time, blocking micro-operations in younger groups from issuing even if they could have been ready-to-issue.

Either if the number of occupied issue groups was determined at step 112 to be less than the maximum number permitted, or if the number of occupied entries was determined at step 112 to be at the maximum number but a tracking entry has been freed up by switching the oldest occupied issue group to issuing at step 114, at step 116 the next "free" issue group in the allocation sequence is switched to "occupied" (by updating the status field 36 of that issue group's tracking entry in tracking structure 32). The given micro-operation is assigned to that newly "occupied" issue group, and the register access pattern information 40, 42 of the corresponding tracking entry for that issue group is set based on which portions of the first/second register sets 20, 22 are accessed by the micro-operation. Also, the micro-operation count field 38 is set to indicate the number of micro-operations assigned to the group (e.g. 1 micro-operation, when this is the first micro-operation assigned to the group).

On the other hand, if at step 104 it was determined that the given micro-operation currently being assigned an issue group did not have any conflict for access to the first register set 20 with any micro-operation already assigned to the youngest occupied issue group, then at step 120 the youngest occupied issue group is identified as being a candidate issue group for assigning to the given micro-operation.

However, it may also be possible to assign an older issue group to the given micro-operation, depending on conflicts with any micro-operations in such older groups. Hence, at steps 122 to 128 a group search procedure can be performed, in reverse age order of the issue groups, to identify further candidate issue groups (if any). However, such queue jumping may not always be enabled. Some implementations may support disabling of "queue jumping" (to prevent a micro-operation being assigned a group other than the youngest occupied group). If disabling of queue jumping is supported, then at step 121 the issue group allocation circuitry 30 determines whether a jump (allocation of the given micro-operation to a group other than the youngest occupied group) is permitted. Some implementations may always support queue jumping (but vary the extent to which queue jumping is possible by adjusting the maximum number of occupied entries allowed as discussed for step 112). However, other implementations may support the option of disabling queue jumping altogether, depending on the jump preference 76 from the issue circuitry 10. Hence, if queue jumping is currently disabled, there is no need to perform the group search in reverse age order as discussed below for steps 122, 124, 128, and the method can proceed straight to step 130 based on the already identified youngest occupied issue group as the only candidate for being allocated the current micro-operation.

However, if queue jumping is currently enabled, then at step 122, the issue group allocation circuitry 30 checks the entry of the tracking structure 32 that corresponds to the issue group that is next oldest after the previous candidate issue group considered in the search procedure. For the first pass through step 122, this next oldest issue group will be the next oldest issue group relative to the youngest occupied issue group which was considered at steps 104 and 120. For later passes through step 122, the next oldest issue group can be a further issue group two or more issue groups older than the youngest occupied issue group considered at steps 104 and 120. The issue group allocation circuitry 30 determines whether the status 36 for the next oldest issue group is "occupied", and if not then the search procedure can terminate as there are no remaining occupied issue groups which could be candidates for assigning the given micro-operation.

If the next oldest issue group is determined to be "occupied" at step 122, at step 124 (either sequential to or in parallel with the assessment of whether the group is occupied) the issue group allocation circuitry 30 checks whether the given micro-operation specifies a register access pattern which conflicts with either:

the ZA access pattern recorded by the portion indicators 40 in the entry corresponding to the next oldest group, which track the issue group's access to the first register set 20; or the Z access pattern recorded by portion indicators 42 in the entry corresponding to the previously detected candidate group selected at step 120 or a previous pass of step 128. If this is the first pass through step 124, the entry whose Z access pattern indicators 42 is checked will be the current youngest occupied issue group identified at step 120. If this is a subsequent pass through step 124, the entry whose Z access pattern indicators 42 is checked will be the next youngest issue group after the group currently being checked as the next oldest (i.e. the issue group which was previously considered the "next oldest" group in the previous pass of step 124). The check at step 124 does not require comparison of the Z access pattern indicators 42 associated with the entry for the "next oldest" group itself— only the entry associated with the next youngest issue group after that next oldest group has its Z access pattern information 42 checked. Therefore, it is not a problem if the given micro-operation has a vector register conflict with another micro-operation in the group currently being considered the "next oldest group" for candidate selection (as such vector register conflicts relating to access to the vector registers 22 may be handled by the issue circuitry 10 when selecting micro-operations for issue within a given issue group). However, the given micro-operation should not be allocated to a candidate group for which the next youngest group would have a conflict with the given micro-operation concerning access to the second register set (vector registers) 22. This protects against deadlock (otherwise there could be a risk of deadlock when a micro-operation in an older group cannot issue because it depends on a vector operand from a micro-operation in a younger issue group which can never be issued until the micro-operation in the older group has issued).

Hence, if the given micro-operation either has an array register conflict (detected based on ZA access pattern 40 of the entry corresponding to the next oldest issue group selected at step 122), or has a vector register conflict (detected based on the Z access pattern 42 of the next youngest entry after the entry corresponding to the next oldest issue group selected at step 122), then the search procedure terminates and the group currently selected as the next oldest issue group at step 122 is not considered as a candidate issue group for assigning to the given micro-operation. The method proceeds to step 130 in that case.

If it is determined from steps 122, 124 that the next oldest issue group is occupied and does not have any ZA register conflict with the given micro-operation concerning access to the array registers 20 and the next youngest issue group (next youngest after the group considered "next oldest" for this instance of steps 122, 124) has no Z register conflict with the given micro-operation concerning access to the vector registers 22, then at step 128 the issue group currently considered the "next oldest issue group" is identified as an additional candidate issue group which could be considered for assigning to the given micro-operation. The search procedure then returns to step 122 to move to an even older issue group and check the next oldest issue group after the latest candidate issue group. Hence, multiple passes may be performed through steps 122, 124, 128 until eventually an older issue group is identified which is either marked as "Issuing" or "Free" or has a register conflict identified. At this point the method proceeds to step 130.

Hence, having reached step 130, a set of one or more candidate issue groups will have been identified (at least the single youngest occupied issue group identified at step 120, and possibly at least one older issue group selected at step 128 depending on the outcomes of steps 121, 122, 124). If there is only one candidate issue group, that candidate issue group will be the youngest occupied issue group, which is selected as the issue group to be assigned to the given micro-operation at step 132.

However, if there is more than one candidate issue group identified from steps 120 and 128, then at step 130 the issue group allocation circuitry 30 selects, as the issue group to be assigned to the given micro-operation, the one of the candidate issue groups which is the oldest candidate issue group for which the micro-operation count value 38 has not already reached the maximum number of micro-operations permitted per issue group. Hence, at step 132, the oldest of the candidate issue groups that is available to accept the given micro-operation is assigned to the given micro-operation.

Regardless of which particular issue group is selected at step 130, at step 132 the ID of the selected candidate issue group is assigned to the micro-operation when the micro-operation is forwarded to the issue queue 50 (together with the jump tag 56 which will be set to indicate a jumped micro-operation if the assigned issue group was an older issue group selected as a candidate at step 128 or to indicate a non-jumped micro-operation if the assigned issue group is the youngest occupied issue group selected as a candidate at step 120). The entry of tracking structure 32 corresponding to the selected candidate issue group is updated, to set any register portion indicators 40, 42 that correspond to portions of the first/second register sets 20, 22 that are accessed by the given micro-operation, and to increment the micro-operation count value 38 to reflect that an additional micro-operation has been assigned to the issue group.

While FIG. 5 shows group assignment steps performed for a single micro-operation, it will be appreciated that in some implementations the issue group allocation circuitry 30 may have sufficient bandwidth to perform group assignment for multiple micro-operations in the same processing cycle (either back to back, or if done in parallel, with some additional circuit logic provided to check for hazards between the different micro-operations being assigned issue groups in parallel and so ensure that hazarding micro-operations which conflict for access to the same portion of the first register set 20 are not assigned to the same group).

Figure 6:
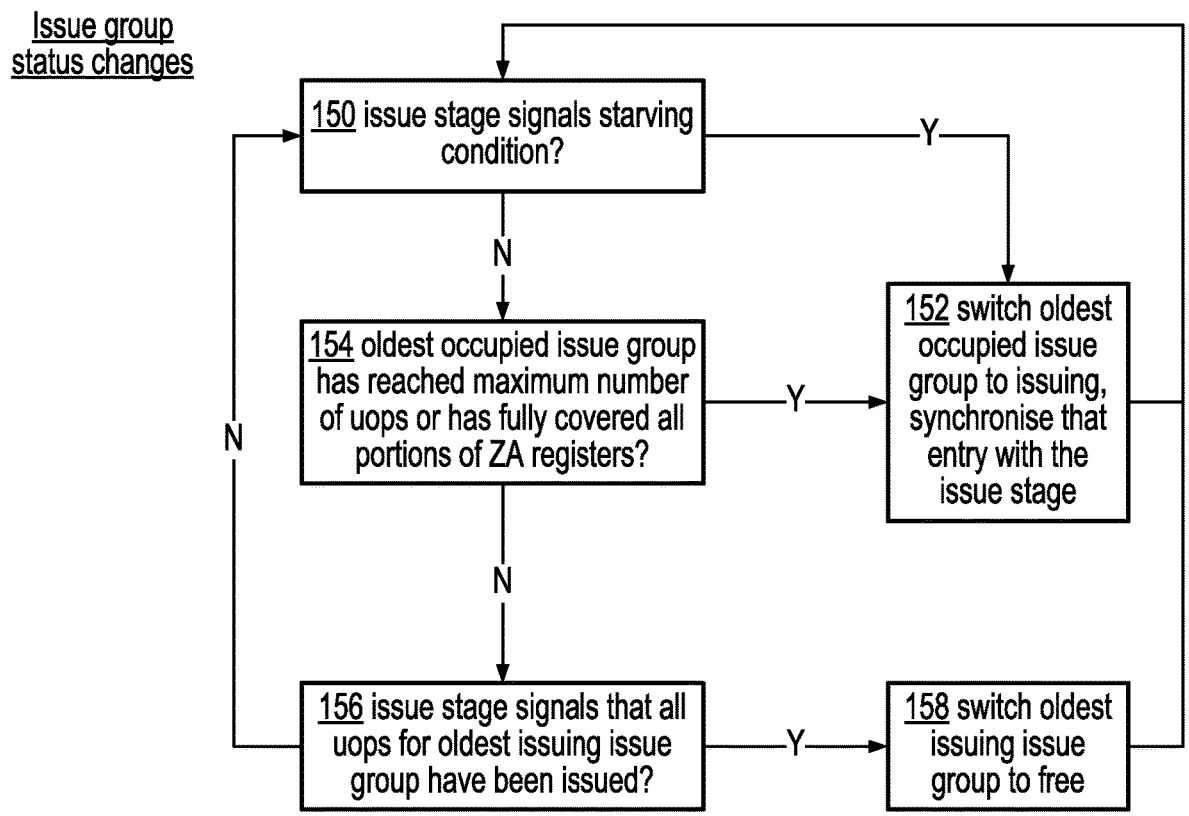
FIG. 6 illustrates steps for controlling changes of status for issue groups.

FIG. 6 illustrates steps for controlling changes in issue group status 36 for a given issue group. At step 150, the issue group allocation circuitry 30 determines whether the issue stage 10 has asserted the starvation signal 72 to indicate that it is starved of instructions that could be issued. If the issue stage 10 has indicated that a starvation condition is satisfied using the starvation signal 72, then at step 152 the issue group allocation circuitry 30 updates the status 36 for the oldest occupied issue group, to switch that issue group to "issuing", and synchronises the ID 34 and number of micro-operations 36 associated with that issue group with the issue group tracker 60 in the issue circuitry 10.

At step 154, the issue group allocation circuitry 30 determines whether the micro-operation count value 38 for the oldest occupied issue group has reached the maximum number of micro-operations permitted per issue group, or that all ZA access pattern portion indicators 40 are set to indicate that, collectively, the oldest occupied issue group has fully covered all portions of the array register storage corresponding to the first register set 20. If one of these conditions is satisfied, then it will not be possible to allocate any further micro-operations to the oldest occupied issue group, and so at step 152 the oldest occupied issue group is synchronised with the issue stage and switched to the "issuing" status, the same as described earlier for step 152.

If, at step 156, the issue group allocation circuitry 30 detects that the issue stage 10 has signalled on synchronisation interface 70 that all micro-operations for the oldest issue group currently in the "issuing" status have been issued, then at step 158 the issue group allocation circuitry 30 updates the status 36 for that issue group from "issuing" to "free", so that the issue group can be available for later assignment to younger micro-operations.

Figure 7:
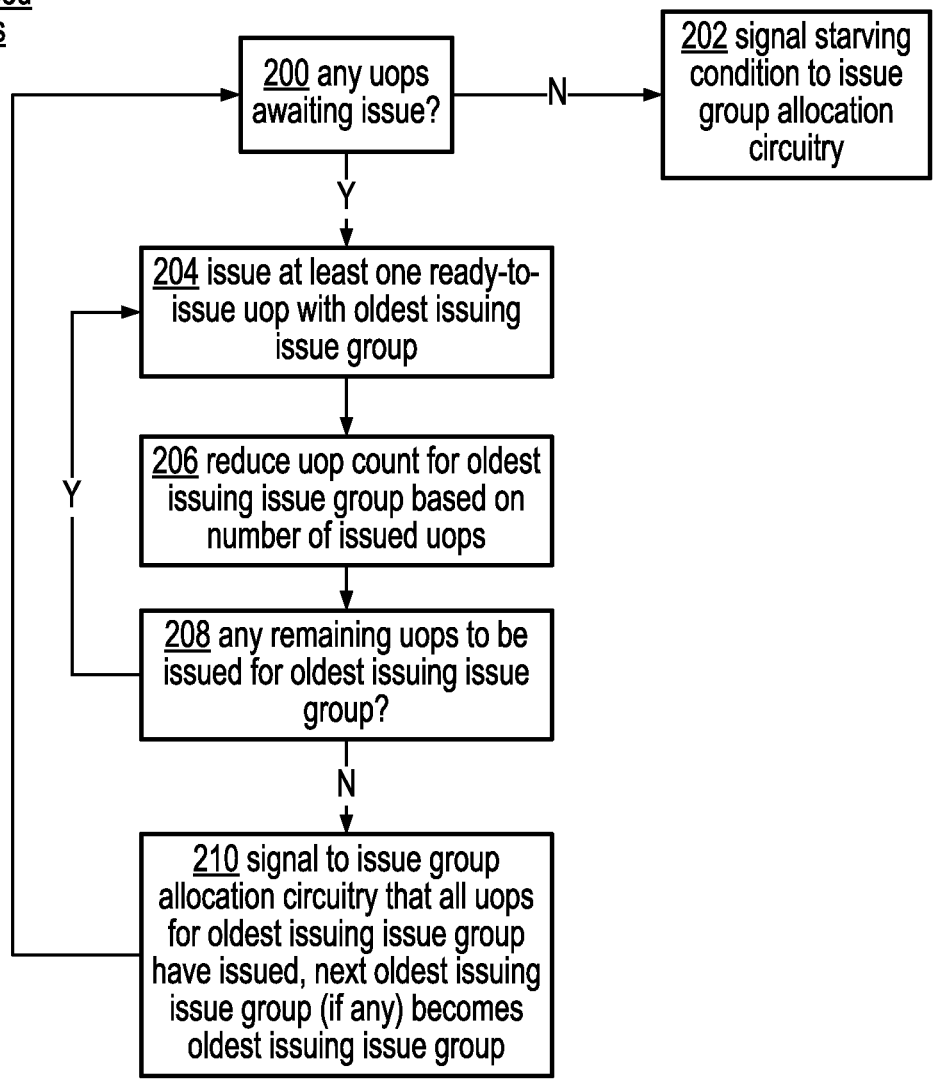
FIG. 7 illustrates steps for controlling issue of micro-operations based on the issue groups to which the micro-operations have been assigned.

FIG. 7 illustrates steps for control of micro-operation issuing by the issue circuitry 10. At step 200, the issue circuitry 10 determines whether it has any micro-operations awaiting issue (in some cases by detecting whether the issue circuitry 10 has any issue groups which are issuable, based on checking whether the tracking entry in the issue group tracker 60 specifies any ID 62 associated with a non-zero number of micro-operations 64). If there are no micro-operations awaiting issue (or no issuable issue groups), then at step 202 the issue circuitry 10 asserts the starvation signal 72 to signal the starving condition to the issue group allocation circuitry 30.

If the issue circuitry 10 does have at least one micro-operation that could in principle be issued (subject to any other issue readiness conditions being satisfied which are not related to the conflicts associated with access to the first register set 20), then the starvation signal 72 is deasserted. At step 204 the issue circuitry 10 issues at least one ready-to-issue micro-operation associated with the oldest issue group currently in the "issuing" status. If multiple micro-operations are available for that issue group, the issue circuitry 10 can select between those micro-operations based on any information other than which portions of the first register set 20 are accessed by those micro-operations. There is no need to consider the accesses made by those micro-operations to the first register set 20, because this has already been pre-calculated by the issue group allocation circuitry 30 in setting the group assignment for the micro-operations, so the micro-operations in the same issue group are already known not to have any conflicts for access to the first register set 20. The issue circuitry 10 may still need to check for register conflicts between micro-operations in the same issue group concerning access to other register sets, such as the second (vector) register set 22. The issue circuitry 10 may also need to consider other aspects such as architectural ordering requirements between memory access operations (or alternatively, checking for memory ordering violations can be left up to the execution circuitry 12). The issue circuitry 10 could also consider availability of physical resources (such as specific execution units in the execute circuitry 12) when selecting which micro-operation to select for issue next. If there are no other reasons to favour selecting one micro-operation ahead of another in the same group, the issue circuitry 10 can select an arbitrary micro-operation from the group or can select the micro-operations in program order. However, out-of-order issue is permitted, and it can be useful if an older micro-operation in program order is stalled due to awaiting operands or availability of execution units, to enable a younger micro-operation in program order in the same issue group (pre-computed by the issue group allocation circuitry 30 as not having a ZA register conflict with the stalled micro-operation) to make progress. Hence, the group assignment greatly simplifies issue control by avoiding the need to decode ZA register access information for respective pairs of micro-operations in every cycle of issue selection.

Having issued at least one ready-to-issue micro-operation from the oldest issue group having the "issuing" status, at step 206, the issue circuitry 10 updates the count value 64 in the corresponding tracking entry of tracker 60, to reduce the micro-operation count for the oldest "issuing" issue group based on the number of issued micro-operations selected at step 204.

At step 208, the issue circuitry 10 determines whether there are any remaining micro-operations to be issued for the oldest issue group having the "issuing" status. If so, then the method returns to step 204 to issue further micro-operations from the group. Once all micro-operations have been issued for the current oldest issue group having "issuing" status, at step 210, the issue stage 10 uses the synchronisation interface 70 to signal to the issue group allocation circuitry 30 that all micro-operations for the oldest "issuing" issue group have finished issuing (to allow the issue group allocation circuitry 30 to set that issue group as "free" as explained at step 158 of FIG. 6). Subsequently, the next oldest issue group (if any) having the "issuing" status becomes the oldest issuing issue group, and the method returns to step 200 to continue issue control.

Figure 8:
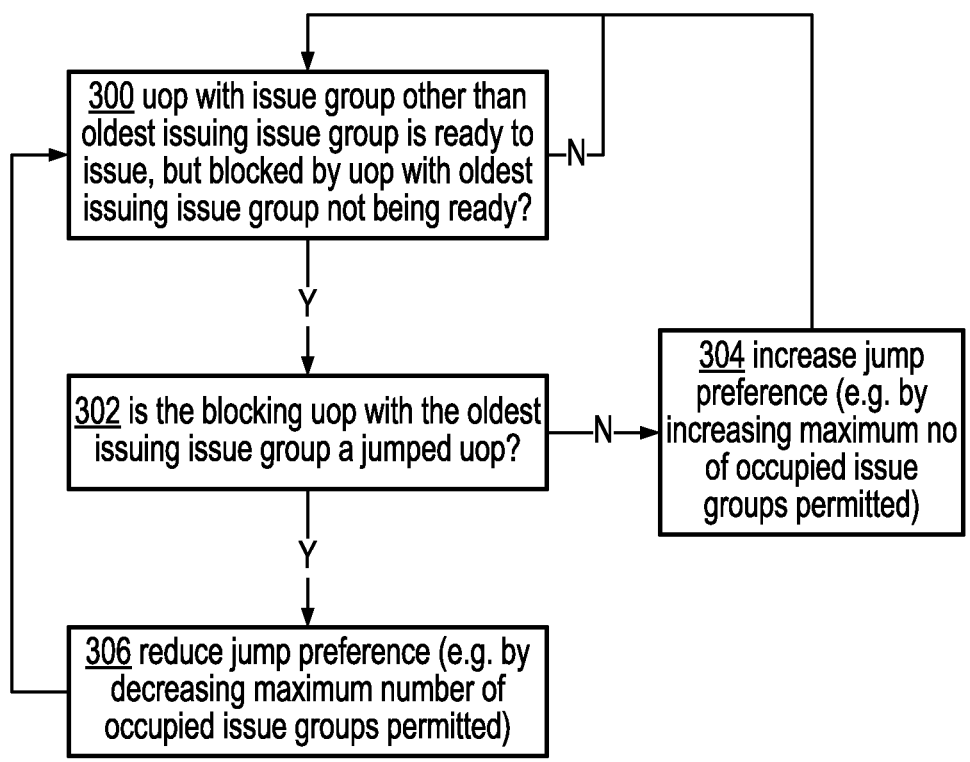
FIG. 8 illustrates steps for jump preference control.

FIG. 8 illustrates steps for the issue circuitry 10 to set the jump preference information 76 used by the issue group allocation circuitry 30 to adjust a preference for "jumping" (e.g. by adjusting the maximum number of "occupied" issue groups permitted at a given time). At step 300, if the issue circuitry 10 detects that a micro-operation in an issue group other than the oldest "issuing" issue group is ready to issue, but is blocked from issuing because at least one micro-operation in the oldest "issuing" issue group is not yet ready to issue, then at step 302 the issue circuitry 10 checks the "jump" tag 56 of the blocking micro-operation from the oldest "issuing" issue group, to determine whether that blocking micro-operation is a "jumped" micro-operation which was assigned to a group that was older than the youngest "occupied" issue group at the time of group assignment for that blocking micro-operation, or a "non-jumped" micro-operation which was assigned to a group that was the youngest "occupied" issue group at the time of group assignment for that blocking micro-operation or which was a newly created younger group created because of register conflict with a micro-operation in the youngest occupied issue group.

If the blocking micro-operation is determined to be a non-jumped micro-operation, then this indicates an opportunity by which, in future, performance could be improved by increasing the extent of jumping (making it more likely the blocked micro-operation detected in the younger issue group at step 300 could in future have been allocated to an older group making it less likely it was blocked by the blocking micro-operation). Therefore, at step 304 the issue circuitry 10 updates the jump preference signal 76 to indicate an increased preference for jumping. In response, the issue group allocation circuitry 30 may increase the maximum number of "occupied" issue groups permitted at a given time.

On the other hand, if the blocking micro-operation is identified as being a jumped micro-operation, then this indicates a loss of performance due to too much queue jumping, and it may be more likely in future that performance could be improved by reducing the extent to which jumping is permitted. Therefore, at step 306 the issue circuitry 10 updates the jump preference signal 76 to indicate a reduced preference for jumping. In response, the issue group allocation circuitry 30 may reduce the maximum number of "occupied" issue groups permitted at a given time.

Other options for indicating increased/reduced jump preference may be for the issue group allocation circuitry 30 to maintain a "jump" confidence value which is incremented in response to an indication of increased jump preference and decremented in response to an indication of reduced jump preference (or vice versa), with a comparison of the jump confidence value against a threshold determining whether jumping is considered enabled or disabled for the check at step 121 of FIG. 5.

It will be appreciated that, for all the flow charts described above, while the flow charts for sake of example show one particular sequence of operations as a sequential series of steps, some of these steps can be performed in a different order or could be performed at least partially in parallel with each other if they do not have a particular dependency between them.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
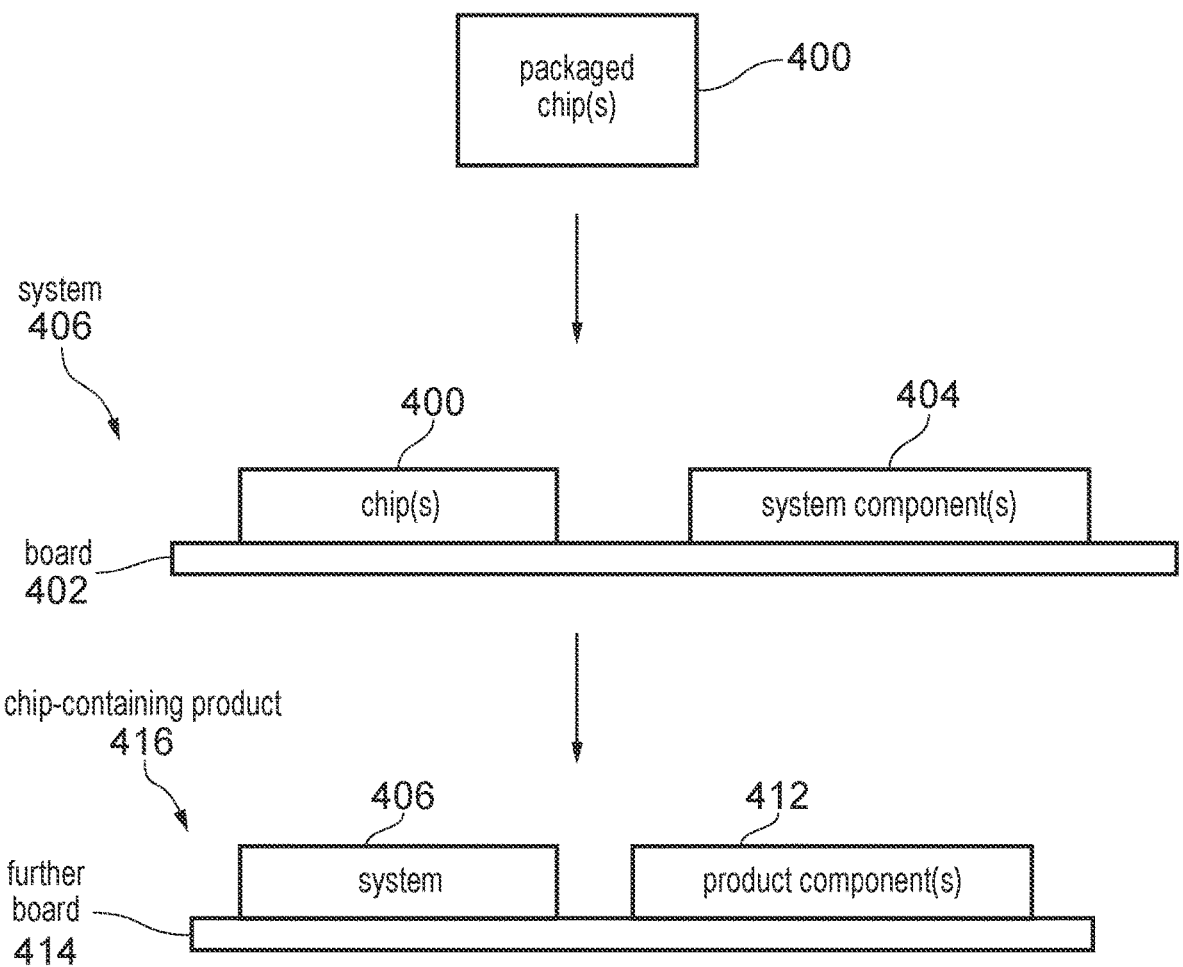
FIG. 9 illustrates a system and a chip-containing product.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   issue circuitry to issue micro-operations for execution; and
   issue group allocation circuitry to control allocation of each micro-operation to one of a plurality of issue groups, depending on detection of register conflicts between micro-operations, the register conflicts concerning access to registers of a first register set; in which:
   the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
   the issue circuitry is configured to control issue of the micro-operations based on the issue groups, to prevent any instruction in a given issue group being issued until all micro-operations in any older issue group than the given issue group have been issued.

2. The apparatus according to clause 1, in which the first register set comprises array registers for storing a two-dimensional array of elements.

3. The apparatus according to any of clauses 1 and 2, in which the first register set is addressable in a plurality of different access patterns depending on micro-operation register access pattern information specified by a micro-operation which references the first register set.

4. The apparatus according to any of clauses 1 to 3, in which in response to a register conflict being detected for the given micro-operation with respect to a youngest issue group that has been allocated at least one micro-operation, the issue group allocation circuitry is configured to start allocation for a next youngest issue group and allocate the given micro-operation to that next youngest issue group.

5. The apparatus according to any of clauses 1 to 4, in which when group-jumping is enabled, the issue group allocation circuitry is capable of allocating the given micro-operation to an issue group older than a current youngest issue group.

6. The apparatus according to clause 5, in which, when group-jumping is enabled, the issue group allocation circuitry is configured to allocate the given micro-operation to a selected issue group among a set of candidate issue groups for which each candidate issue group is an issue group for which neither that issue group nor any younger issue group has any register conflict with the given micro-operation, the selected issue group comprising the oldest of the set of candidate issue groups that is able to accept at least one further micro-operation in the issue group.

7. The apparatus according to clause 6, in which each candidate issue group is an issue group for which neither that candidate issue group nor any younger issue group has any register conflict with the given micro-operation for accesses to the first register set, and for which no younger issue group than that candidate issue group has a register conflict with the given micro-operation for accesses to a second register set.

8. The apparatus according to any of clauses 5 to 7, in which the issue circuitry is configured to provide jump preference information, and the issue group allocation circuitry is configured to control an extent to which group-jumping is enabled based on the jump preference information.

9. The apparatus according to clause 8, in which the issue group allocation circuitry is configured to control, based on the jump preference information, a maximum number of occupied issue groups already allocated with at least one micro-operation which are not yet in an issuing state in which the issue circuitry is able to issue micro-operations from that issue group.

10. The apparatus according to any of clauses 8 and 9, in which the issue circuitry is configured to adjust the jump preference information based on detection of instances when a first micro-operation not yet ready to issue in an older issue group is blocking issue of a second micro-operation in a younger issue group which, other than awaiting issuing of all micro-operations for the older issue group, is ready to issue.

11. The apparatus according to any of clauses 1 to 10, in which:
   the issue group allocation circuitry is configured to maintain a plurality of issue group tracking entries, each issue group tracking entry being associated with a corresponding issue group and tracking a status of the corresponding issue group, the status being specified as one of free, occupied and issuing;
   the issue group allocation circuitry is configured to detect register conflicts based on the issue group tracking entries for which the status is occupied; and
   the issue circuitry is configured to defer issuing of a given instruction until after the status of the issue group to which the given instruction is allocated has become issuing.

12. The apparatus according to clause 11, in which each issue group tracking entry specifies group register access pattern information specifying which of a plurality of portions of a first register set are accessed by any one or more micro-operations allocated to the corresponding issue group; and the issue group allocation circuitry is configured to detect register conflicts between the given micro-operation and one or more micro-operations of a given issue group based on micro-operation register access pattern information specified by the given micro-operation and the group register access pattern information specified by the issue group tracking entry for the given issue group.

13. The apparatus according to clause 12, in which the issue group allocation circuitry is configured to switch an oldest occupied issue group from occupied to issuing in response to detecting that the group register access pattern information for the oldest occupied issue group indicating that every one of the plurality of portions is accessed by at least one micro-operation allocated to the oldest occupied issue group.

14. The apparatus according to any of clauses 11 to 13, in which the issue group allocation circuitry is configured to switch an oldest occupied issue group from occupied to issuing in response to detecting a number of micro-operations allocated to the oldest occupied issue group having reached a maximum number of micro-operations allowed in one group.

15. The apparatus according to any of clauses 11 to 14, in which the issue group allocation circuitry is configured to switch an oldest occupied issue group from occupied to issuing in response to a starvation signal received from the issue circuitry indicative of the issue circuitry being starved of micro-operations available to issue in a current processing cycle.

16. The apparatus of clause 15, comprising delay circuitry to delay transfer of the starvation signal for at least one processing cycle between transmission by the issue circuitry and receipt by the issue group allocation circuitry.

17. The apparatus according to any of clauses 11 to 16, in which the issue group allocation circuitry is configured to switch an oldest occupied issue group from occupied to issuing in response to detecting that a number of occupied issue groups has reached a maximum number of occupied issue groups and a new occupied issue group is to be allocated due to a register conflict being detected between the given micro-operation and a current youngest issue group.

18. A system comprising:
the apparatus of any of clauses 1 to 17, implemented in at least one packaged chip;
at least one system component; and
a board,
wherein the at least one packaged chip and the at least one system component are assembled on the board.

19. A chip-containing product comprising the system of clause 18 assembled on a further board with at least one other product component.

20. A method comprising:
control allocation of micro-operations to a plurality of issue groups, depending on detection of register conflicts between the micro-operations, the register conflicts concerning access to registers of a first register set, a given micro-operation being allocated to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and based on the issue groups, controlling issue of the micro-operations for execution, where any instruction in a given issue group is prevented from being issued until all micro-operations in any older issue group than the given issue group have been issued.

21. Computer-readable code for fabrication of an apparatus comprising:
issue circuitry to issue micro-operations for execution; and
issue group allocation circuitry to control allocation of each micro-operation to one of a plurality of issue groups, depending on detection of register conflicts between micro-operations, the register conflicts concerning access to registers of a first register set; in which:
the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
the issue circuitry is configured to control issue of the micro-operations based on the issue groups, to prevent any instruction in a given issue group being issued until all micro-operations in any older issue group than the given issue group have been issued.

22. A computer-readable storage medium storing the computer-readable code of clause 21.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:
1. An apparatus comprising:
issue circuitry to issue micro-operations for execution; and
issue group allocation circuitry to control allocation of each micro-operation to one of a plurality of issue groups, depending on detection of register conflicts between micro-operations, the register conflicts concerning access to registers of a first register set; in which:
the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
the issue circuitry is configured to control issue of the micro-operations based on the issue groups, to prevent any instruction in a given issue group being issued until all micro-operations in any older issue group than the given issue group have been issued.

2. The apparatus according to claim 1, in which the first register set comprises array registers for storing a two-dimensional array of elements.

3. The apparatus according to claim 1, in which the first register set is addressable in a plurality of different access patterns depending on micro-operation register access pattern information specified by a micro-operation which references the first register set.

4. The apparatus according to claim 1, in which in response to a register conflict being detected for the given micro-operation with respect to a youngest issue group that has been allocated at least one micro-operation, the issue group allocation circuitry is configured to start allocation for a next youngest issue group and allocate the given micro-operation to that next youngest issue group.

5. The apparatus according to claim 1, in which when group-jumping is enabled, the issue group allocation circuitry is capable of allocating the given micro-operation to an issue group older than a current youngest issue group.

6. The apparatus according to claim 5, in which, when group-jumping is enabled, the issue group allocation circuitry is configured to allocate the given micro-operation to a selected issue group among a set of candidate issue groups for which each candidate issue group is an issue group for which neither that issue group nor any younger issue group has any register conflict with the given micro-operation, the selected issue group comprising the oldest of the set of candidate issue groups that is able to accept at least one further micro-operation in the issue group.

7. The apparatus according to claim 6, in which each candidate issue group is an issue group for which neither that candidate issue group nor any younger issue group has any register conflict with the given micro-operation for accesses to the first register set, and for which no younger issue group than that candidate issue group has a register conflict with the given micro-operation for accesses to a second register set.

8. The apparatus according to claim 5, in which the issue circuitry is configured to provide jump preference information, and the issue group allocation circuitry is configured to control an extent to which group-jumping is enabled based on the jump preference information.

9. The apparatus according to claim 8, in which the issue group allocation circuitry is configured to control, based on the jump preference information, a maximum number of occupied issue groups already allocated with at least one micro-operation which are not yet in an issuing state in which the issue circuitry is able to issue micro-operations from that issue group.

10. The apparatus according to claim 8, in which the issue circuitry is configured to adjust the jump preference information based on detection of instances when a first micro-operation not yet ready to issue in an older issue group is blocking issue of a second micro-operation in a younger issue group which, other than awaiting issuing of all micro-operations for the older issue group, is ready to issue.

11. The apparatus according to claim 1, in which:
the issue group allocation circuitry is configured to maintain a plurality of issue group tracking entries, each issue group tracking entry being associated with a corresponding issue group and tracking a status of the corresponding issue group, the status being specified as one of free, occupied and issuing;
the issue group allocation circuitry is configured to detect register conflicts based on the issue group tracking entries for which the status is occupied; and
the issue circuitry is configured to defer issuing of a given instruction until after the status of the issue group to which the given instruction is allocated has become issuing.

12. The apparatus according to claim 11, in which each issue group tracking entry specifies group register access pattern information specifying which of a plurality of portions of a first register set are accessed by any one or more micro-operations allocated to the corresponding issue group; and
the issue group allocation circuitry is configured to detect register conflicts between the given micro-operation and one or more micro-operations of a given issue group based on micro-operation register access pattern information specified by the given micro-operation and the group register access pattern information specified by the issue group tracking entry for the given issue group.

13. The apparatus according to claim 12, in which the issue group allocation circuitry is configured to switch an oldest occupied issue group from occupied to issuing in response to detecting at least one of:
the group register access pattern information for the oldest occupied issue group indicating that every one of the plurality of portions is accessed by at least one micro-operation allocated to the oldest occupied issue group; and
a number of micro-operations allocated to the oldest occupied issue group having reached a maximum number of micro-operations allowed in one group.

14. The apparatus according to claim 11, in which the issue group allocation circuitry is configured to switch an oldest occupied issue group from occupied to issuing in response to a starvation signal received from the issue circuitry indicative of the issue circuitry being starved of micro-operations available to issue in a current processing cycle.

15. The apparatus of claim 14, comprising delay circuitry to delay transfer of the starvation signal for at least one processing cycle between transmission by the issue circuitry and receipt by the issue group allocation circuitry.

16. The apparatus according to claim 11, in which the issue group allocation circuitry is configured to switch an oldest occupied issue group from occupied to issuing in response to detecting that a number of occupied issue groups has reached a maximum number of occupied issue groups and a new occupied issue group is to be allocated due to a register conflict being detected between the given micro-operation and a current youngest issue group.

17. A system comprising:
the apparatus of claim 1, implemented in at least one packaged chip;
at least one system component; and
a board,
wherein the at least one packaged chip and the at least one system component are assembled on the board.

18. A chip-containing product comprising the system of claim 17 assembled on a further board with at least one other product component.

19. A method comprising:
controlling allocation of micro-operations to a plurality of issue groups, depending on detection of register conflicts between the micro-operations, the register conflicts concerning access to registers of a first register set, a given micro-operation being allocated to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
based on the issue groups, controlling issue of the micro-operations for execution, where any instruction in a given issue group is prevented from being issued until all micro-operations in any older issue group than the given issue group have been issued.

20. A non-transitory computer-readable medium to store computer-readable code for fabrication of an apparatus comprising:
issue circuitry to issue micro-operations for execution; and
issue group allocation circuitry to control allocation of each micro-operation to one of a plurality of issue groups, depending on detection of register conflicts between micro-operations, the register conflicts concerning access to registers of a first register set; in which:
the issue group allocation circuitry is configured to allocate a given micro-operation to a selected issue group for which no micro-operation already allocated to the selected issue group has a register conflict with the given micro-operation and the selected issue group is a younger issue group than any issue group already allocated an older micro-operation than the given micro-operation for which a register conflict is detected between the given micro-operation and the older micro-operation; and
the issue circuitry is configured to control issue of the micro-operations based on the issue groups, to prevent any instruction in a given issue group being issued until all micro-operations in any older issue group than the given issue group have been issued.

\* \* \* \* \*